US008811464B1

(12) United States Patent
Venkataraman et al.

(10) Patent No.: US 8,811,464 B1
(45) Date of Patent: Aug. 19, 2014

(54) METHOD AND APPARATUS FOR ADAPTIVELY DETERMINING EQUALIZER SETTINGS FOR 10GBASE-KR TRANSMITTER

(75) Inventors: Jagadish Venkataraman, Santa Clara, CA (US); Jamal Riani, Santa Clara, CA (US); Pui Shan Wong, Sunnyvale, CA (US)

(73) Assignee: Marvell International Ltd. (BM)

( * ) Notice: Subject to any disclaimer, the term of this patent is extended or adjusted under 35 U.S.C. 154(b) by 330 days.

(21) Appl. No.: 12/978,718

(22) Filed: Dec. 27, 2010

Related U.S. Application Data

(60) Provisional application No. 61/297,224, filed on Jan. 21, 2010.

(51) Int. Cl.
*H03K 5/159* (2006.01)

(52) U.S. Cl.
USPC ............ 375/232; 375/233; 375/348; 375/229

(58) Field of Classification Search
USPC .......................................................... 375/232
See application file for complete search history.

(56) References Cited

U.S. PATENT DOCUMENTS

| 4,424,533 | A | * | 1/1984 | Rzeszewski | ............... | 348/614 |
| 5,345,476 | A | | 9/1994 | Tsujimoto | | |
| 5,481,564 | A | | 1/1996 | Kakuishi et al. | | |
| 5,561,687 | A | | 10/1996 | Turner | | |
| 5,870,484 | A | * | 2/1999 | Greenberger | ............... | 381/300 |
| 5,937,007 | A | | 8/1999 | Raghunath | | |
| 5,946,351 | A | * | 8/1999 | Ariyavisitakul et al. | ..... | 375/233 |
| 7,426,236 | B1 | | 9/2008 | He | | |
| 7,639,749 | B2 | * | 12/2009 | Gupta et al. | ................... | 375/260 |
| 2009/0103669 | A1 | | 4/2009 | Kolze et al. | | |
| 2010/0020860 | A1 | * | 1/2010 | Dai et al. | ....................... | 375/231 |

OTHER PUBLICATIONS

M. Li, et al., "FIR Filter Optimisation as Pre-Emphasis of High-Speed Backplane Data Transmission", Electronics Letters, Jul. 8, 2004, vol. 40, No. 14 (2 pgs).
802.3ap IEEE Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment 4: Ethernet Operation Over Electrical Backplanes, IEEE Computer Society sponsored by LAN/MAN Standards Committee, IEEE Std. 802.3ap—2007 (Amendment to IEEE Std 802.3—2005) May 22, 2007 (203 pgs).
U.S. Patent and Trademark Office (USPTO), Non-Final Office Action issued in U.S. Appl. No. 12/951,278 (filed Nov. 22, 2010) having a Notification Date of Nov. 23, 2012 (10 pgs).

(Continued)

*Primary Examiner* — Lihong Yu

(57) ABSTRACT

Apparatuses, methods, and other embodiments associated with adaptively determining equalizer setting for 10GBASE-KR transmitter are described. According to one embodiment, an apparatus for tuning an equalizer configured to undo the effects of a channel connecting a transmitter communicating to a receiver via a backplane includes a tuning logic configured to adaptively determine equalizer settings for the equalizer. The tuning logic includes a symmetric search logic configured to determine a desired boost setting for the equalizer, and an asymmetric search logic configured to determine a desired phase response for the equalizer.

14 Claims, 6 Drawing Sheets

(56) References Cited

OTHER PUBLICATIONS

United States Patent and Trademark Office (USPTO), Office Action (FINAL) in pending U.S. Appl. No. 12/951,278 (filing date Nov. 22, 2010) having a Notification Date of May 14, 2013 (13 pgs).

United States Patent and Trademark Office (USPTO), Office Action (NON-FINAL) in pending U.S. Appl. No. 12/951,278, filing date Nov. 22, 2010) having a Notification Date of Sep. 26, 2013 (14 pgs).

* cited by examiner

METHOD AND APPARATUS FOR ADAPTIVELY DETERMINING EQUALIZER SETTINGS FOR 10GBASE-KR TRANSMITTER

CROSS REFERENCE TO RELATED APPLICATIONS

This application claims the benefit of U.S. Provisional Application No. 61/297,224 filed on Jan. 21, 2010, which is hereby wholly incorporated by reference.

BACKGROUND

With the emergence of high-speed serial interfaces, high-speed backplane technology is replacing conventional low-speed parallel bus technology. However, high-speed serial interfaces may be susceptible to issues including inter symbol interference (ISI). ISI is the spreading of symbols, which leads to energy from one symbol degrading subsequent symbols. ISI may be caused, for example, by amplitude attenuation, group delay distortion, and so on.

Receivers are traditionally configured with a feed-forward equalizer (FFE) that attempts to undo some of the effects on a signal caused by the channel that carries the signal. For channels with extensive attenuation around the Nyquist frequency, a FFE needs to provide significant high-frequency boosting to improve the signal to noise ratio (SNR). However, such high-frequency boosting generally causes noise power enhancement. Noise power enhancement can be partially mitigated if some portion of the channel equalization is performed at the transmitter. The 10GBASE-KR standard therefore defines a three-tap filter to perform channel equalization at the transmitter. Adaptively determining an acceptable, near-optimum, and/or optimum transmit equalizer setting has conventionally been difficult, non-deterministic, and/or time consuming.

An acceptable, near-optimum, and/or optimum transmit equalizer setting may depend on existing channel conditions and thus may not be pre-determinable. Therefore, transmitters and receivers may need to be configured to adaptively determine the settings for the three-tap filter. Some conventional systems for adaptively determining an optimal transmit equalizer rely on minimum mean square error (MMSE) based adaptation and thus may operate in $O(N^2)$ time because the systems consider $O(N^2)$ data points. Additionally, these conventional systems may ignore the fact that the transmit equalizer needs to be deconvolved from the FFE output samples before being used in the adaptation equation. Implementing a deconvolution circuit can be difficult and can result in a circuit having stability issues. MMSE based approaches may also suffer because the same error signal is used to adapt the timing recovery loop, the FFE/decision feedback equalizer (DFE) setting, and the transmit equalizer setting, which can cause undesired interaction between the various loops which in turn causes tap values to drift, which can degrade the SNR.

Other conventional systems for adaptively determining acceptable, near-optimal, and/or optimal transmit equalizer settings rely on a simplex-based approach. While this search is based on SNR, such a search may be too complex to implement practically. Also, this type of search assumes that transmitter settings can be controlled exactly, which is not a practical reality. In practice, a receiver may only request that a transmitter either increase or decrease tap values in an equalizer. The transmitter may then choose to change the tap values to lie somewhere within the permissible limits described, for example, in a standard. However, the way in which the tap values are changed may not follow a trajectory that facilitates reducing the size of a search space. Since the tap values cannot be controlled exactly, the search mechanism may be slow to converge to a solution, and if the search mechanism does converge, the convergence may not be to an optimal solution.

SUMMARY

In one embodiment a method for adaptively determining equalizer settings for a three-tap filter in a 10GBASE-KR transmitter includes initializing the three-tap filter to first equalizer settings where a precursor tap $f_{-1}$ in the three-tap filter is set to a value A1, where a main tap $f_0$ in the three-tap filter is set to a value A2, and where a postcursor tap $f_1$ is set to a value A3, where A1, A2, and A3 fall within a range of acceptable values associated with the three tap filter. The method also includes performing, until a first termination condition is met, repeatedly determining first signal-to-noise ratios (SNRs) associated with different equalizer settings where A1=A3, and where A1, A2, and A3 vary within the range of acceptable values according to a first variance function. The method also includes selecting a fixed value for A2 as a function of the first SNRs and re-initializing the three-tap filter to second equalizer settings where f is set to a value B1, $f_0$ is set to a value B2 that equals the fixed value for A2, and $f_1$ is set to a value B3, where B1 and B3 fall within the range of acceptable values. The method also includes performing, until a second termination condition is met, repeatedly determining second SNRs associated with different equalizer settings where B1 does not equal B3, and where B1 and B3 vary within the range of acceptable values according to a second variance function. The method also includes selecting final values for $f_{-1}$, $f_0$, and $f_1$ as a function of the second SNRs and transforming the three tap filter into a different state based on the final values for $L_1$, $f_0$, and $f_1$.

In another embodiment an apparatus for tuning an equalizer configured to undo the effects of a channel connecting a transmitter communicating to a receiver via a backplane includes a tuning logic configured to adaptively determine equalizer settings for the equalizer, the tuning logic comprising a symmetric search logic configured to determine a desired boost setting for the equalizer, and an asymmetric search logic configured to determine a desired phase response for the equalizer.

In another embodiment a device includes an equalizer circuit configured to undo effects of a channel connecting a transmitter communicating to a receiver via a backplane, the equalizer circuit including a three-tap filter. The device also includes a tuning circuit configured to adaptively determine equalizer settings for the equalizer circuit. The tuning circuit includes a symmetric search circuit configured to determine an optimal value for a main tap in a three tap filter, where the optimal value describes a desired boost setting for the equalizer. The device also includes an asymmetric search circuit configured to determine an optimal value for a precursor tap and for a postcursor tap in the three tap filter, where the optimal values for the precursor tap and for the postcursor tap describe a desired phase response for the equalizer. The device also includes a signal-to-noise circuit configured to determine a signal-to-noise ratio of a transmission over a channel connecting the transmitter and receiver.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are example apparatuses and methods associated with adaptively determining equalizer settings for a transmitter—e.g., a 10GBASE-KR transmitter. In one embodiment, a two part search for tap values for a three tap equalizer is performed. During a first (symmetric) portion, a desired boost setting is identified. During a second (asymmetric portion), the boost setting is maintained and a phase response that delivers a desired SNR (e.g., best SNR, or a predetermined SNR) at the receiver is identified.

Figure 1:
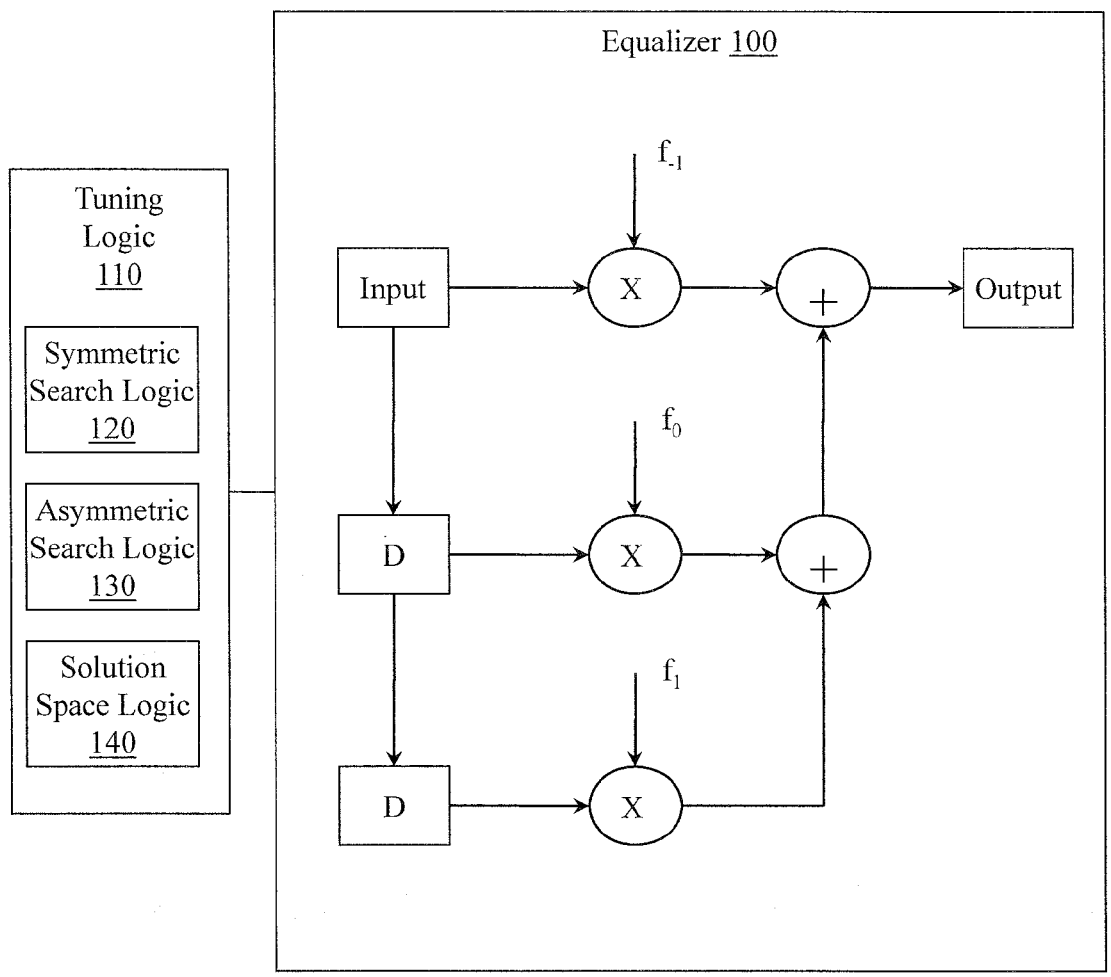
FIG. 1 illustrates one embodiment of an apparatus associated with adaptively determining equalizer settings for a 10GBASE-KR transmitter.

FIG. 1 illustrates a transmit equalizer 100 and tuning logic 110 that are associated with adaptively determining settings for a 10GBASE-KR transmitter. The transmit equalizer 100 receives an input and produces an output. The transmit equalizer 100 is illustrated as a three-tap ($f_{-1}$, $f_0$, $f_1$) filter that may be implemented as a finite impulse response (FIR) structure. Standards (e.g., IEEE 802.3ap) may constrain the design of the three-tap filter and therefore facilitate reducing a solution space to be searched for suitable tap values. For example, the peak power of the transmitter associated with the filter may be fixed. Also, by design choice or by convention, the $f_{-1}$ and $f_1$ taps of the three-tap filter may be assumed to be zero or negative. For the equations provided below, the $f_{-1}$ and $f_1$ taps of the three-tap filter are negative. Searching for a setting for the transmit equalizer 100 can be performed in two phases once a solution space for the setting is determined. The solution space constrains the range of values for the taps.

Figure 2:
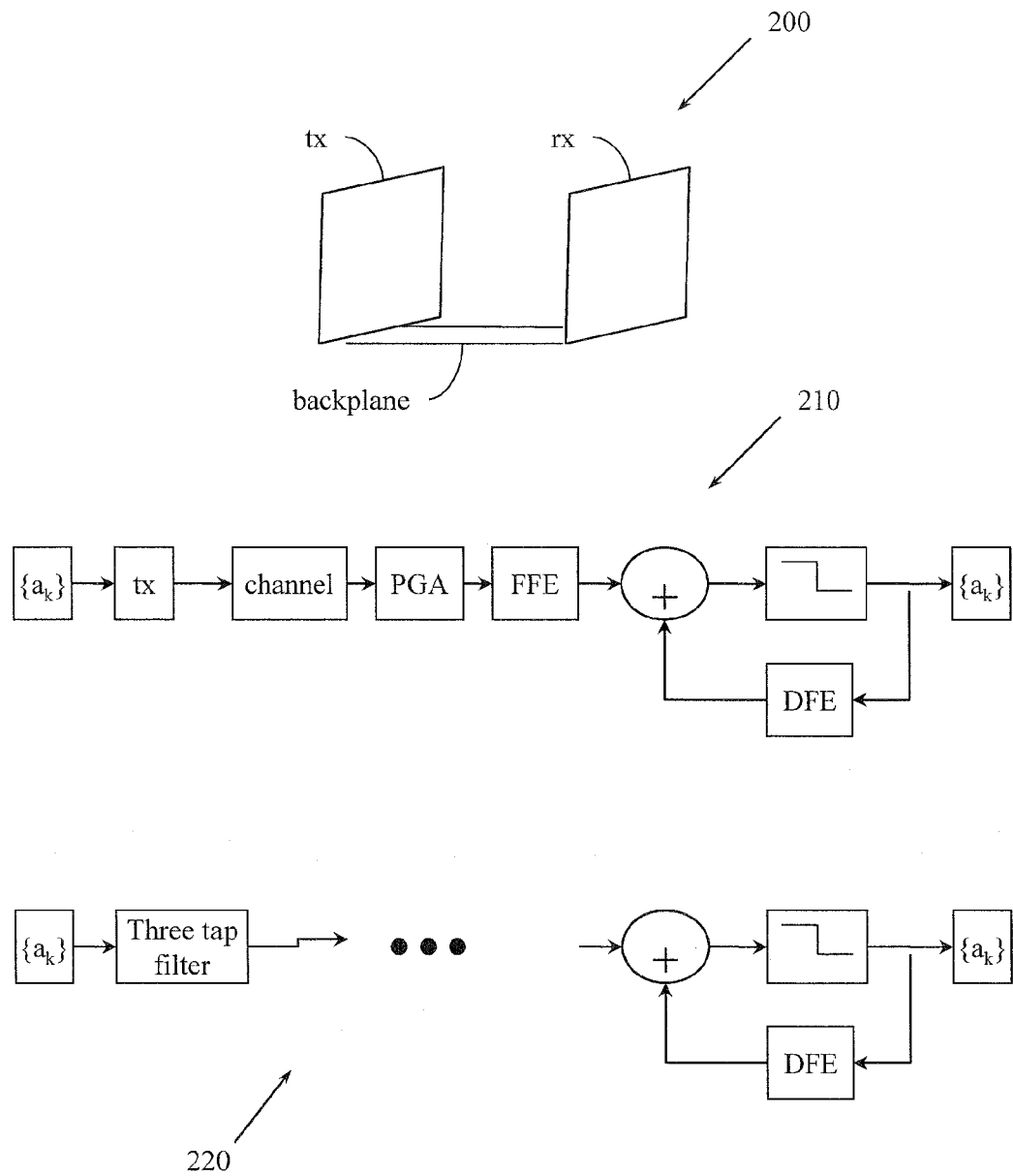
FIG. 2 illustrates an environment in which an apparatus associated with adaptively determining equalizer settings for a 10GBASE-KR transmitter can operate.

FIG. 2 illustrates a typical 10GBASE-KR communication environment 200. The environment 200 can include a transmitter (tx) connected to a receiver (rx) by a backplane. Communication path 210 illustrates some of the elements that may be involved in a communication from the transmitter (tx) to the receiver (rx). Communication path 220 illustrates where a three tap filter may be inserted.

10GBASE-KR devices may include a digital to analog converter (DAC), an analog to digital converter (ADC), a programmable gain amplifier (PGA), a feed forward equalizer (FFE), a decision feedback equalizer (DFE), and other components. Assuming the digital to analog converter (DAC) gain to be A, then the peak positive amplitude at the DAC output is $A(f_0-f_{-1}-f_1)$. If the peak amplitude cannot exceed $\pm A$, then:

$A(f_0-f_{-1}-f_1) \leq A$, which leads to:

$$(f_0-f_{-1}-f_1) \leq 1 \qquad \text{(equation 1)}$$

Given the peak power constraints in equation 1, the minimum value that the precursor ($f_{-1}$) and postcursor ($f_1$) taps can take on during the adaptation process can be determined. The steady-state voltage at the DAC output for low-frequency data is $A(f_0+f_{-1}+f_1)$. Assuming that the insertion loss at these frequencies is almost 0 db, then the dynamic range at the analog to digital converter (ADC) input is given by:

$$\pm AG(f_0+f_{-1}+f_1)$$

where G is the gain of the programmable gain amplifier (PGA). Denoting the dynamic range at the ADC input by $\pm D$ yields:

$$AG(f_0+f_{-1}+f_1)=D$$

As the precursor and/or postcursor taps become more negative, the PGA has to provide higher gain to meet the dynamic range requirement of the ADC. If the maximum PGA gain is $G^{max}$, this yields:

$$AG^{MAX}(f_0+f_{-1}+f_1)=D$$

The minimum value for the precursor is obtained when the postcursor tap is 0, and the minimum value for the postcursor is obtained when the precursor tap is 0. Assuming $f_1=0$, then the minimum value for $f_{-1}$ is given by:

$$AG^{MAX}(f_0 + f_{-1}^{min}) = D, \text{ which leads to}$$

$$AG^{MAX}(1 + 2f_{-1}^{min}) = D, \text{ which in turn leads to}$$

$$f_{-1}^{min} = ((D/AG^{MAX}) - 1)/2.$$

Referring to equation 1 above helps understand this substitution.

When both the precursor taps and the postcursor taps are non-zero, the precursor taps and the postcursor taps satisfy the following inequality constraint, which represents the solution space in which the search for transmit equalizer settings is to be constrained.

$$(f_{-1}+f_1) >= ((D/AG^{MAX})-1)/2$$

For convenience, $((D/AG^{MAX})-1)/2$ may be referred to as $\Phi$.

Returning now to FIG. 1, in one embodiment, transmit equalizer 100 is configured to undo the effects of a channel connecting a transmitter communicating to a receiver via a backplane. Transmit equalizer 100 is tuned by tuning logic 110. Tuning logic 110 is configured to adaptively determine equalizer settings for the transmit equalizer 100.

The tuning logic 110 includes a symmetric search logic 120 configured to determine a desired boost setting for the transmit equalizer 100 and an asymmetric search logic 130 configured to determine a desired phase response for the transmit equalizer 100. The transmitter for which transmit equalizer 100 provides equalization may be, for example, a 10GBASE-KR Ethernet card. Similarly, the receiver connected to the transmitter may be a 10GBASE-KR Ethernet card.

Figure 3:
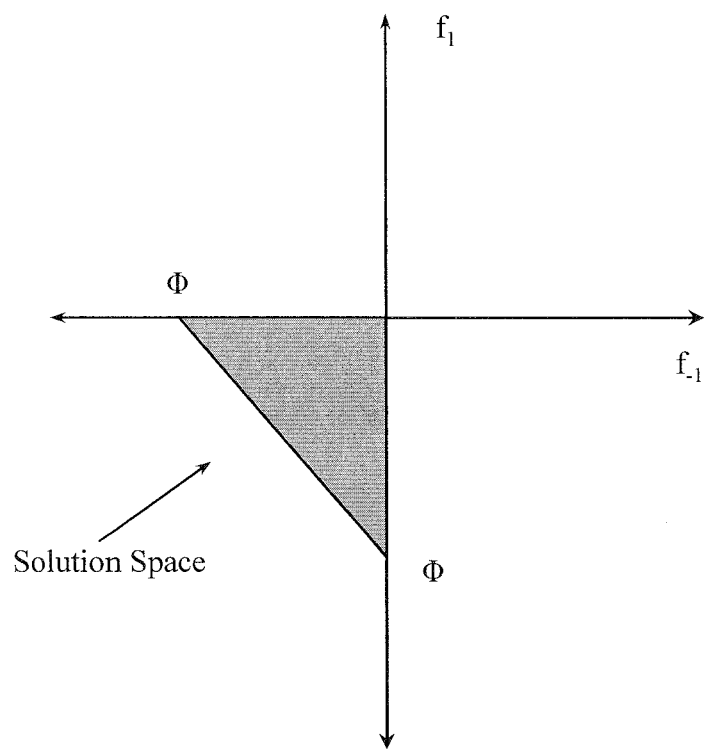
FIG. 3 illustrates a search space associated with adaptively determining equalizer settings for a 10GBASE-KR transmitter.
Figure 4:
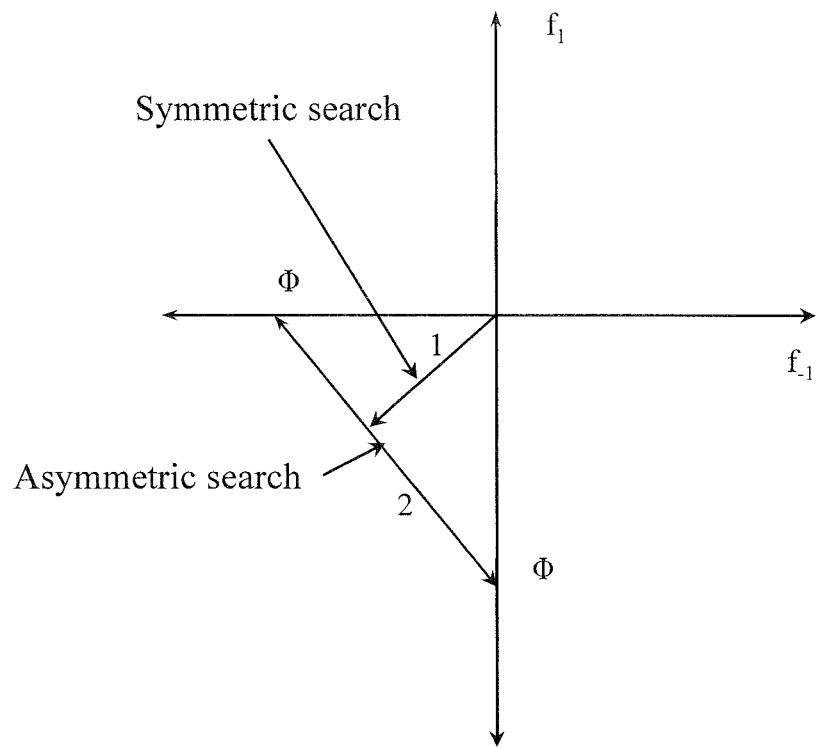
FIG. 4 illustrates a search strategy associated with adaptively determining equalizer settings for a 10GBASE-KR transmitter.

In one example, the transmit equalizer 100 is a three-tap filter, where the three taps are denoted a precursor tap $f_{-1}$, a main tap $f_0$, and a postcursor tap $f_1$. The symmetric search logic 120 may be configured to determine the desired boost setting by initializing the three-tap filter to first equalizer settings where $f_{-1}$=A1, $f_0$=A2, and $f_1$=A3, where A1, A2, and A3 fall within a range of acceptable values associated with the three tap filter. The range of acceptable values is constrained by the solution space described above and illustrated in FIG. 3. The symmetric search logic 120 may facilitate repeatedly determining signal-to-noise ratios (SNRs) for different settings of the transmit equalizer 100. The settings will have A1=A3, and will have A1, A2, and A3 varying within the range of acceptable values according to a pre-determined plan. The pre-determined plan may be controlled, for example, by a first variance function. In FIG. 4, one plan is illustrated proceeding along line 1. When the symmetric search logic 120 is done, a fixed value A2 for the main tap will be selected.

The asymmetric search logic 130 may be configured to determine the desired phase response by re-initializing the three-tap filter to second equalizer settings that are based, at least in part, on the results of the symmetric search logic 120. In one example, the asymmetric search logic 130 first sets the tap values to $f_{-1}$=B1, $f_0$=B2=the fixed value for A2, and $f_1$=B3. B1 and B3 will be constrained to fall within the range of acceptable values. After reconfiguring the three-tap filter, the asymmetric search logic 130 may then facilitate repeatedly determining SNRs for different equalizer settings. In the different equalizer settings, B1 will not equal B3, B2 will be constant, and B1 and B3 will vary within the range of acceptable values according to a pre-determined plan.

In one example, the tuning logic 110 may also include a solution space logic 140. Solution space logic 140 may be configured to determine the range of acceptable values as a function of a 10GBASE-KR constraint concerning maximum amplitude output at a transmitter and as a function of a programmable gain amplifier (PGA) maximum gain constraint.

Given the solution space as described above and as illustrated in FIG. 3, tuning logic 110 may first perform a symmetric search where $f_{-1}$ is constrained to equal $f_1$ while $f_0$ is allowed to vary within the solution space. The tuning logic 110 may then perform an asymmetric search involving varying $f_{-1}$ and/or $f_1$ according to a search strategy where $f_{-1}$ is not constrained to equal $f_1$, while $f_0$ is held constant at a value that is a function of the values determined during the first symmetric search, and where $f_{-1}$ and $f_1$ are allowed to vary within the solution space. The first search identifies the amount of high-frequency boosting that is required to pre-equalize the channel. The second search determines which setting(s) can provide an acceptable, near optimal, and/or optimal SNR by altering the phase response of the boost filter. This strategy can be viewed as searching for the degree of precursor/postcursor ISI compensation that is needed at the transmitter.

In one embodiment, the first (symmetric) search begins by resetting the transmitter tap values to {0, 1, 0}. In this embodiment, the search then proceeds along a line 1 with unit slope as shown in FIG. 4. At different points along the line 1 different values for $f_{-1}$, $f_0$, and $f_1$ are established. For the different states defined by the different values, the programmable gain amplifier (PGA), feed forward equalizer (FFE), decision feedback equalizer (DFE), and timing recovery loops are allowed to reconverge and then the signal-to-noise ratio (SNR) is recorded. The search will continue until termination conditions exist. The termination conditions concern whether SNR is getting better or worse, whether the SNR is getting better at an acceptable rate, whether an acceptable SNR has been found, whether the maximum or minimum value for a tap has been reached, and so on. The different points in the symmetric search represent different high-frequency boosts at the transmitter. Boosting the high frequency de-emphasizes the low-frequency data, which causes a reduction in the amplitude of the low-frequency signal content. The greater the high-frequency boost at the transmitter, the more the PGA will have to compensate to achieve the required dynamic range at the input to the analog to digital converter (ADC). After the search is completed, the transmit equalizer 100 may be reconfigured by setting the tap values close to the state that recorded the desired SNR. The desired SNR may be, for example, the best SNR, the first SNR that was found to be acceptable, and so on. After reconfiguring the transmit equalizer based on the results of the symmetric search, the asymmetric search can begin.

In one embodiment, the asymmetric search involves decreasing the precursor tap and increasing the postcursor tap while maintaining the main tap at the value decided upon by the symmetric search. This is represented by line 2 in FIG. 4. At the states defined by the different tap values, the PGA, FFE, DFE, and timing recovery loops are allowed to reconverge and then the SNR is recorded. The search will continue until termination conditions exist. The termination conditions concern whether SNR is getting better or worse, whether the SNR is getting better at an acceptable rate, whether an acceptable SNR has been found, whether the maximum or minimum value for a tap has been reached, and so on. The different states associated with the different tap values represent changes in the phase response of the equalizer at the transmitter. When the asymmetric search is completed, final values for the taps can be computed. In one embodiment, the two phase search will yield a near-optimum transmit equalizer setting in O(n) time as opposed to conventional systems that may produce a less than near-optimum solution in O($n^2$) time.

Figure 5:
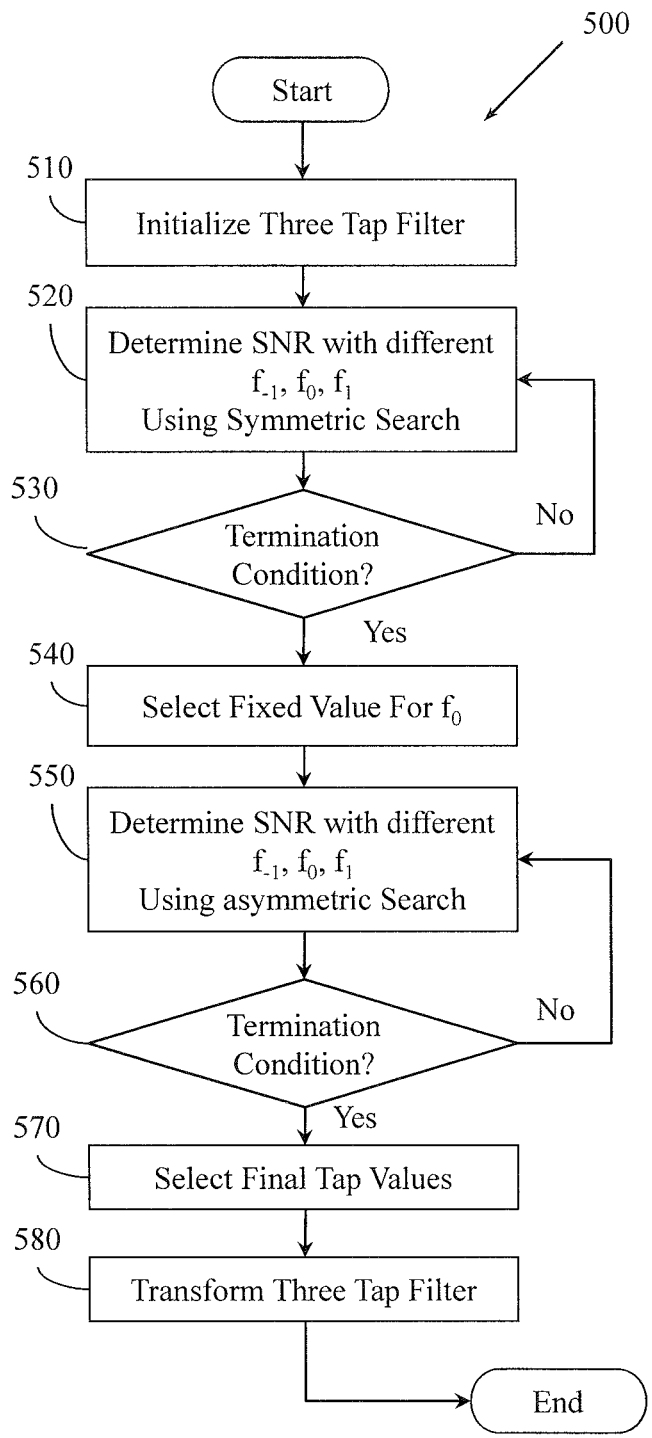
FIG. 5 illustrates one embodiment of a method associated with adaptively determining equalizer settings for a 10GBASE-KR transmitter.

FIG. 5 illustrates one embodiment of a method 500 associated with adaptively determining equalizer settings for a 10GBASE-KR transmitter. The equalizer includes a three-tap filter. At 510, method 500 begins by initializing the three-tap filter to first equalizer settings. For these initial settings, $f_{-1}$=A1, $f_0$=A2, and $f_1$=A3. A1, A2, and A3 are all constrained to fall within a range of acceptable values associated with the three tap filter. In one example, the initial values are 0, 1, 0. In different embodiments, other initial values may be employed.

At 520, method 500 repeatedly determines signal-to-noise ratios (SNRs) associated with different equalizer settings. In these different equalizer settings, A1 is constrained to be equal to A3, and A1, A2, and A3 are constrained to vary within the range of acceptable values. A1, A2, and A3 vary according to a pre-determined plan that may be described, for example, by a first variance function. Line 1 on FIG. 4 illustrates a trajectory described by one example first variance function.

In one example, repeatedly determining SNRs includes performing a series of actions. The actions include changing A2 by a ΔA2 to a new value. The change and the Δ may be determined by a first variance function. The actions also include changing A1 by a ΔA1 to a new value. Once again, the change and the Δ may be determined by the first variance function. The actions also include changing A3 to A1. After the changes to the taps are made, the actions include allowing a programmable gain amplifier (PGA) in a receiver to reconverge, allowing a feed forward equalizer (FFE) in the receiver to reconverge, and allowing the timing recovery to reconverge in the receiver. After the PGA, the FFE, and the timing recovery have reconverged, the SNR for the current values of A1, A2, and A3 is recorded, as are the current values of A1, A2, and A3. In one example, the first variance function controls changing A1, A2, and A3 according to one or more of, (ΔA1=1, ΔA2=−2), and ((ΔA1=−1, ΔA2=2).

The determining at 520 may continue until ascertaining at 530 that a first termination condition has been met. In different examples, the termination condition may exist when either an acceptable SNR is found, when a near-optimal SNR is found, when an optimal SNR is found, when the realm of possibilities for tap values has been exhausted, and so on. In one example, the termination condition may exist when the first SNR that is acceptable to the 10GBASE-KR standard is found. This may provide a very fast result, although it may not yield an optimal or near-optimal result. In another example, the termination condition may exist when a threshold number of SNRs have been computed (e.g., a maximum number of attempts), when the SNRs start getting worse (e.g., current SNR worse than last SNR), when the SNRs stop improving above a threshold improvement rate (e.g., current SNR only marginally better than last SNR), or when one or more of A1, A2, and A3 have reached a limit defined by the range of acceptable values. In one example, the first termination condition exists if $f_{-1}=\Phi/2$, $f_0=1+\Phi$, and that $f_1=\Phi/2$, where $\Phi=((D/AG_{max})-1)/2$, where D=range at analog to digital converter (ADC) input, where A=digital to analog converter (DAC) gain, and where $G_{max}$=gain of programmable gain amplifier (PGA).

After the termination condition is met, a fixed value for A2 is selected at 540. In different examples, the fixed value for A2 may be selected in different ways. However, the fixed value for A2 will be selected as a function of the SNRs determined at 520. In different examples, the fixed value for A2 may include selecting the A2 associated with the best SNR found at 520, and selecting the A2 associated with the first SNR found at 520 that is above a threshold associated with a standard associated with the 10GBASE-KR transmitter.

Method 500 then re-initializes the three-tap filter to second equalizer settings. For the re-initialization, $f_{-1}$=B1, $f_0$=B2=the fixed value for A2, and $f_1$=B3. B1 and B3 are constrained to fall within the range of acceptable values. In one example, B1=0 and B3 equals a maximum value for $f_1$ in the range of acceptable values.

At 550, method 500 includes repeatedly determining SNRs associated with different equalizer settings. In these different equalizer settings, B1 is not constrained to equal B3 and B1 and B3 vary within the range of acceptable values. B1 and B3 vary according to a pre-determined plan (e.g., along line 2 in FIG. 4). The pre-determined plan may be described by a second variance function. In one embodiment, repeatedly determining SNRs at 550 includes performing several actions. The actions include changing B1 by a ΔB1 to a new value. The changing and the Δ may be controlled by a second variance function. One example function is illustrated as line 2 in FIG. 4. The actions may also include changing B3 by a ΔB3 to a new value. Once again, the changing and the Δ may be controlled by the second variance function. Recall that in the asymmetric search performed at 550 that B2 may be held constant. After changing the tap values, the actions can include allowing the PGA to reconverge, allowing the FFE to reconverge, and allowing the timing recovery to reconverge in the receiver. After the PGA, the FFE, and the timing recovery have reconverged, then the SNR associated with the current values of B1, B2, and B3 can be recorded along with the values for B1, B2, and B3.

The determining at 550 continues until a second termination condition is met at 560. In different embodiments, there can be different second termination conditions. In one embodiment designed to act quickly, the second termination condition may be met as soon as one of the SNRs computed at 550 is above a threshold associated with a standard associated with the 10GBASE-KR transmitter. In other embodiments designed to produce optimal or near-optimal results, the first acceptable SNR may not be selected. Instead, the second termination condition may exist when a threshold number of SNRs have been computed at 550, when the SNRs start getting worse, when the SNRs are not improving at a rate above threshold improvement rate, and when one or more of B1 and B3 have reached a limit defined by the range of acceptable values.

At 570, final values for $f_{-1}$, $f_0$, and $f_1$ are selected. These values are selected as a function of the SNRs determined at 550. In one example, the tap values associated with the best SNR determined at 550 may be selected. In another example, the tap values associated with the last SNR determined at 550 may be selected. Different tap values may be selected in different examples.

At 580, the three tap filter is transformed into a different state based on the final values for $f_{-1}$, $f_0$, and $f_1$. This facilitates performing some equalization at the transmitter which in turn facilitates undoing the effects on the signal of the channel.

In one example, method 500 may first determine the range of acceptable values before initializing the three tap filter at 510. As described above, the range of acceptable values may be determined as a function of a 10GBASE-KR constraint concerning maximum amplitude output at a transmitter where $f_0-f_{-1}-f_1$ is less than or equal to 1. The range of acceptable values may also be determined as a function of a programmable gain amplifier (PGA) maximum gain constraint where $A(f_0+f_1+f_{-1})*G_{max}$=D, D being the dynamic range of an analog to digital converter (ADC) in the 10GBASE-KR receiver, $G_{max}$ being the gain maximum of the PGA in the receiver, and A being the DAC gain at the transmitter. Determining the range of acceptable values can be seen as discovering or computing the solution space illustrated in FIG. 3.

Figure 6:
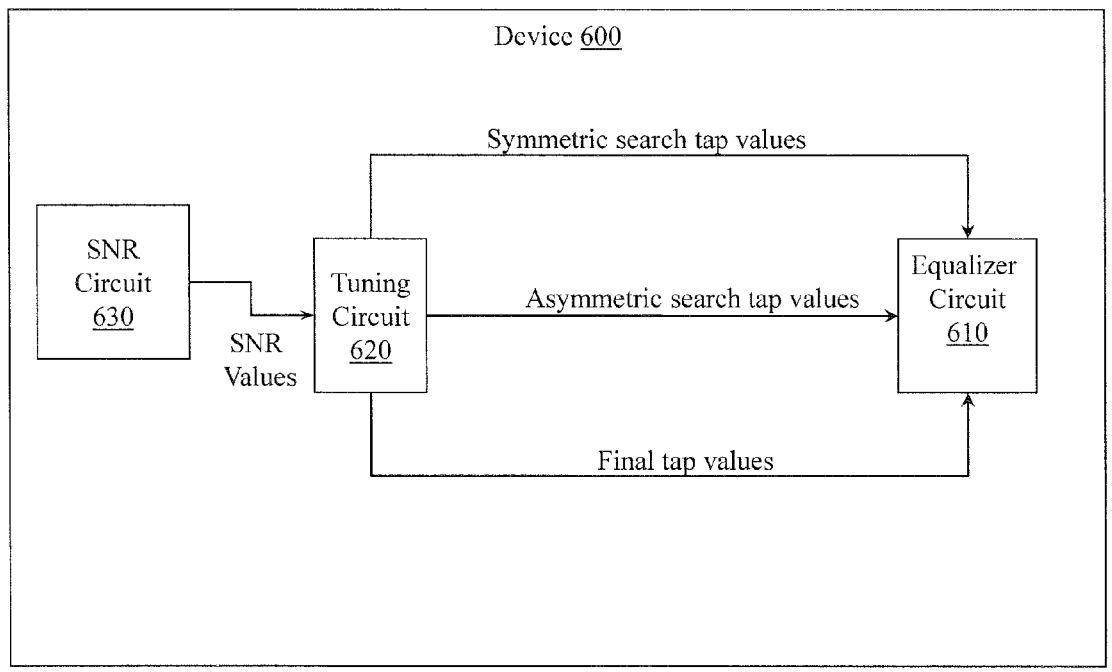
FIG. 6 illustrates a device associated with adaptively determining equalizer settings for a 10GBASE-KR transmitter.

FIG. 6 illustrates a device 600 associated with adaptively determining equalizer settings for a 10GBASE-KR transmitter. Device 600 includes an equalizer circuit 610, a tuning circuit 620, and an SNR circuit 630. Equalizer circuit 610 is configured to undo effects of a channel connecting a transmitter communicating to a receiver via a backplane. The equalizer circuit 610 includes a three-tap filter.

The tuning circuit 620 is configured to adaptively determine equalizer settings for the equalizer circuit 610. The tuning circuit 620 includes a symmetric search circuit that is configured to determine an optimal value for a main tap in a three tap filter. The optimal value describes a desired boost setting for the equalizer. The tuning circuit 620 also includes an asymmetric search circuit that is configured to determine an optimal value for a precursor tap and for a postcursor tap in the three tap filter. The optimal values for the precursor tap and for the postcursor tap describe a desired phase response for the equalizer.

The device 600 also includes a signal-to-noise ratio circuit 630. The SNR circuit 630 is configured to determine a signal-to-noise ratio on a channel connecting the transmitter and receiver. The transmitter and the receiver may be, for example, 10GBASE-KR Ethernet cards.

Tuning circuit 620 first provides tap values determined by a symmetric search of a solution space for the transmitter and equalizer circuit 610. The SNR circuit 630 reports on an SNR achieved using the tap values. After terminating the symmetric search, tuning circuit 620 then provides tap values determined by an asymmetric search of the solution space for the transmitter and equalizer circuit 610. Once again the SNR circuit 630 reports on an SNR achieved using the tap values. After terminating the symmetric search, the tuning circuit 620 provides final tap values to the equalizer circuit 610. The final tap values are intended to make the equalizer circuit 610 operate in a manner that mitigates the effect of the channel connecting the transmitter to the receiver. In one example, the final tap values mitigate the effect of the channel as much as possible.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus for tuning an equalizer, the apparatus comprising:
a tuning logic configured to adaptively determine settings for the equalizer to undo effects of a backplane channel on a signal carried by the backplane channel, wherein the equalizer includes a three-tap filter with a main tap $f_0$ a precursor tap $f_{-1}$ and a postcursor tap $f_1$, the tuning logic comprising:
a symmetric search logic configured to repeatedly and symmetrically vary values of the main tap $f_0$ the precursor tap $f_{-1}$ and the postcursor tap $f_1$ to determine a desired boost setting for the three-tap filter, wherein the symmetric search logic is configured to determine a signal to noise ratio (SNR) for a signal carried on the backplane channel for each iteration of symmetrically varying the values, and wherein the symmetric search logic is configured to symmetrically vary the values over multiple iterations to symmetrically search over a plurality of values for the three-tap filter, and
an asymmetric search logic configured to repeatedly and asymmetrically vary values of the precursor tap $f_{-1}$ and the postcursor tap $f_1$ to determine a desired phase response for the three-tap filter, wherein the asymmetric search logic is configured to determine a signal to noise ratio (SNR) for the signal carried on the backplane channel for each iteration of asymmetrically varying the values, and wherein the asymmetric search logic is configured to asymmetrically vary the values over multiple iterations to asymmetrically search over the plurality of values for the three-tap filter.

2. The apparatus of claim 1, wherein the apparatus includes a transmitter that is 10GBASE-KR Ethernet card, wherein the transmitter communicates over the backplane channel with a receiver that is a 10GBASE-KR Ethernet card, wherein the equalizer and the tuning logic are included within the apparatus, and wherein the desired boost setting pre-equalizes effects of the backplane channel, wherein the symmetric search logic is configured to repeatedly determine the SNR and to repeatedly vary the value of the main tap $f_0$, the precursor tap $f_{-1}$ and the postcursor tap $f_1$ until determining an SNR that satisfies a condition for finding the desired boost setting, and wherein the asymmetric search logic is configured to repeatedly determine the SNR and to repeatedly vary the values of the precursor tap $f_{-1}$ and the postcursor tap $f_1$ until determining an SNR that satisfies a condition for finding the desired phase response.

3. The apparatus of claim 1, wherein the symmetric search logic is configured to perform the symmetric search to determine the desired boost setting by:
initializing the three-tap filter to first settings that include the precursor tap $f_{-1}$ set to a value A1, the main tap $f_0$ set to a value A2, and the postcursor tap $f_1$ set to a third value A3, wherein A1, A2, and A3 are within a range of acceptable values associated with the three tap filter; and
repeatedly determining signal-to-noise ratios (SNRs) produced when changing between different equalizer settings for value A2 of the main tap $f_0$ as determined by a variance function, wherein A1 is set to equal A3, and wherein A1, A2, and A3 are changed to vary within the range of acceptable values.

4. The apparatus of claim 3, the asymmetric search logic being configured to perform the asymmetric search to determine the desired phase response by:
re-initializing the three-tap filter to second settings that include $f_{-1}$ set to a value B1, $f_0$ set to a value B2 that is the value for A2 determined from performing the symmetric search, and $f_1$ set to a value B3, wherein B1 and B3 fall within the range of acceptable values; and repeatedly determining SNRs produced when changing between different equalizer settings for values B1 of the precursor tap $f_{-1}$ and B3 of the postcursor tap $f_1$ as determined by the variance function, wherein B1 is selected to not equal B3, and wherein B1 and B3 vary asymmetrically within the range of acceptable values when performing the asymmetric search.

5. The apparatus of claim 4, the tuning logic further comprising a solution space logic configured to determine the range of acceptable values as a function of a 10GBASE-KR constraint that is based, at least in part, on a maximum amplitude output at a transmitter and as a function of a programmable gain amplifier (PGA) maximum gain constraint.

6. The apparatus of claim 1, wherein the symmetric search logic is configured to symmetrically search by selecting values from the plurality of values that symmetrically vary the main tap $f_0$, the precursor tap $f_{-1}$ and the postcursor tap $f_1$ between iterations of the symmetric search, wherein the asymmetric search logic is configured to asymmetrically search by selecting values from the plurality of values that asymmetrically vary the precursor tap $f_{-1}$ and the postcursor tap $f_1$ between iterations of the asymmetric search.

7. A method for tuning an equalizer that includes a three-tap filter with a main tap $f_0$ a precursor tap $f_{-1}$ and a postcursor tap $f_1$, the method comprising:

adaptively determining equalizer settings for the equalizer to undo effects of a backplane channel on a signal carried by the backplane channel by:

repeatedly and symmetrically varying values of the main tap $f_0$, the precursor tap $f_{-1}$ and the postcursor tap $f_1$ to determine a desired boost setting for the three-tap filter, wherein repeatedly and symmetrically varying the values includes determining a signal to noise ratio (SNR) for the signal on the backplane channel for each iteration of symmetrically varying the values, and wherein symmetrically varying includes symmetrically varying the values over multiple iterations to symmetrically search over a plurality of values for desired boost setting for the three-tap filter; and repeatedly and asymmetrically varying values of the precursor tap $f_{-1}$ and the postcursor tap $f_1$ to determine a desired phase response for the three-tap filter, wherein repeatedly and asymmetrically varying the values includes determining a signal to noise ratio (SNR) for the signal on the backplane channel for each iteration of asymmetrically varying the values, and wherein asymmetrically varying includes asymmetrically varying the values over multiple iterations to asymmetrically search over the plurality of values for the desired phase response for the three-tap filter.

8. The method of claim 7, wherein adaptively determining the equalizer settings includes determining the equalizer settings while the equalizer is operating in a 10GBASE-KR Ethernet card that is transmitting over the backplane channel, wherein the desired boost setting pre-equalizes effects of the backplane channel, wherein repeatedly determining the SNR and repeatedly varying the value of the main tap $f_0$, the precursor tap $f_{-1}$ and the postcursor tap $f_1$ occurs until determining an SNR that satisfies a condition for finding the desired boost setting, and wherein repeatedly determining the SNR and repeatedly varying the values of the precursor tap $f_{-1}$ and the postcursor tap $f_1$ occurs until determining an SNR that satisfies a condition for finding the desired phase response.

9. The method of claim 7, wherein determining the desired boost setting by performing the symmetric search includes:

initializing the three-tap filter to first settings that include the precursor tap $f_{-1}$ set to a value A1, the main tap $f_0$ set to a value A2, and the post cursor tap $f_1$ set to a third value A3, wherein A1, A2, and A3 are within a range of acceptable values associated with the three tap filter; and repeatedly determining signal-to-noise ratios (SNRs) produced when changing between different equalizer settings for the value A2 of the main tap $f_0$ as determined by a variance function, wherein A1 is set to equal A3, and wherein A1, A2, and A3 are changed to vary within the range of acceptable values.

10. The method of claim 9, wherein determining the desired phase response by performing the asymmetric search includes:

re-initializing the three-tap filter to second settings that include $f_{-1}$ set to B1, $f_0$ set to B2 that is a fixed value for A2 as determined from performing the symmetric search, and $f_1$ set to a value B3, wherein B1 and B3 fall within the range of acceptable values; and repeatedly determining SNRs produced when changing between different equalizer settings for values B1 of the precursor tap $f_{-1}$ and B3 of the postcursor tap $f_1$ as determined by the variance function, wherein B1 is selected to not equal B3, and wherein B1 and B3 are changed asymmetrically to vary within the range of acceptable values when performing the asymmetric search.

11. The method of claim 9, further comprising:

determining a range of acceptable values as a function of a 10GBASE-KR constraint that indicates a maximum amplitude output at a transmitter and as a function of a programmable gain amplifier (PGA) maximum gain constraint.

12. The method of claim 7, wherein symmetrically searching includes searching over the plurality of values for the main tap $f_0$, the precursor tap $f_{-1}$ and the postcursor tap $f_1$ by selecting values from the plurality of values that symmetrically vary the main tap $f_0$, the precursor tap $f_{-1}$ and the postcursor tap $f_1$ between iterations of symmetrically searching, wherein asymmetrically searching includes searching over the plurality of values for the precursor tap $f_{-1}$ and the postcursor tap $f_1$ by selecting values from the plurality of values that asymmetrically vary the precursor tap $f_{-1}$ and the postcursor tap $f_1$ between iterations of the asymmetric search.

13. A method for tuning an equalizer that includes a three-tap filter, the method comprising:

repeatedly and symmetrically varying tap values of a main tap $f_{o0}$, a precursor tap $f_{-1}$ and a postcursor tap $f_1$ of the three-tap filter to symmetrically search over a plurality of values for a first combination of the plurality of values that produce a desired boost setting in the equalizer, wherein symmetrically searching includes varying the tap values over a plurality of iterations and determining a signal to noise ratio (SNR) of a signal produced on a backplane channel for each of the plurality of iterations of symmetrically searching;

repeatedly and asymmetrically varying the tap values of the precursor tap $f_{-1}$ and the postcursor tap $f_1$ to asymmetrically search over the plurality of values for a second combination of the plurality of values that produce a desired phase response, wherein asymmetrically searching includes varying the tap values over a plurality of iterations and determining the signal to noise ratio (SNR) of the signal produced on the backplane channel for each of the plurality of iterations of asymmetrically searching, wherein symmetrically searching and asymmetrically searching adaptively determine the desired boost setting and the desired phase response setting for the equalizer to undo effects of the backplane channel on the signal, and wherein the backplane channel is used for communicating between two or more devices.

14. The method of claim 13, wherein symmetrically searching and asymmetrically searching vary the tap values over additional iterations until a termination condition is satisfied, and wherein the termination condition includes one or more of satisfying an SNR requirement or reaching one or more boundary values for the tap values.

* * * * *